United States Patent [15] 3,693,096
Dosey et al. [45] Sept. 19, 1972

[54] ANTENNA COUPLING AND R. F. TUNING CIRCUIT

[72] Inventors: Charles M. Dosey, 1919 Rolling Glen Rd., Baltimore, Md. 21228; John B. Howell, Belfast Rd., Sparks, Md. 21152; Silvio Soares, 7031 Heathfield Rd., Baltimore, Md. 21212

[22] Filed: Dec. 1, 1970

[21] Appl. No.: 94,047

[52] U.S. Cl. ..................325/374, 325/319, 325/383, 334/15

[51] Int. Cl. ..................H04b 1/10

[58] Field of Search......325/318, 319, 373, 374, 488, 325/472; 330/31; 334/15

[56] References Cited

UNITED STATES PATENTS

| | | | |
|---|---|---|---|
| 2,889,453 | 6/1959 | Stern | 325/318 |
| 3,065,424 | 11/1962 | Whisenhunt | 325/319 |

*Primary Examiner*—Robert L. Richardson
*Assistant Examiner*—Richard K. Eckert, Jr.
*Attorney*—Plante, Hartz, Smith & Thompson, Bruce L. Lamb and William G. Christoforo

[57] ABSTRACT

An electrical circuit for coupling a capacitive antenna to a radio receiver is disclosed. A field effect transistor has a gate connected directly to the antenna and a source connected to a resonant circuit for tuning. The field effect transistor isolates the capacitance of the antenna from the tuning circuit thereby rendering the antenna capacitance non-critical to the performance of the receiver. The generation of harmonic energy in the field effect transistor is minimized by connecting high impedance circuitry between the source of the field effect transistor and ground thereby minimizing the voltage developed across the gate-channel junction of the field effect transistor. Embodiments employing capacitive tuning, adapted to use varactors, and inductive tuning, adapted to use slug-tuned coils, are disclosed.

5 Claims, 3 Drawing Figures

INVENTORS
CHARLES M. DORSEY
JOHN B. HOWELL
SILVIO SOARES
BY Plante, Hartz, Smith & Thompson
ATTORNEY

ANTENNA COUPLING AND R. F. TUNING CIRCUIT

This invention relates to automobile radios. More particularly, this invention relates to RF circuitry for coupling an automobile radio receiver to a capacitive antenna.

In radio receivers of presently standard design, the reactance of the antenna used is included as an element of the first tuned circuit of the receiver. In the typical installation, the reactance of the antenna is not continuously tunable as the receiver is tuned across its frequency range. In order to provide optimum system performance, the antenna reactance should be made to track with the other elements of the tuned circuit. Means for causing the antenna reactance to track properly are known in the art. However, such means are very complex and costly and are therefore not used except in situations in which utmost sensitivity is required and the cost is therefore justifiable. The use of means for causing the antenna reactance to track is not economically justifiable in entertainment type receivers.

The present practice in the entertainment receiver art is to adjust the reactance of the antenna at the time of manufacture to some standard value within the tuning range of the receiver. The loss of sensitivity, which results when the radio receiver is tuned away from the prealignment standard frequency, is accepted as the price for using a simple and inexpensive antenna.

In automobile radio receivers, the manufacturer's problem is compounded by the fact that the antenna reactance is not within his control. A capacitive antenna of the whip type or windshield type is normally used, and is installed on the vehicle by the automobile manufacturer rather than the radio manufacturer. In the case of whip type antennas, the difficulty is still further compounded by the fact that the reactance of the antenna will be changed from time to time by the owner of the vehicle as he adjusts the height of his telescoping antenna. The usual practice of automobile radio manufacturers is to prealign the first tuned circuit to an assumed standard value of antenna capacitance and accept the resulting performance degradation. In practice sensitivity degradations as high as 13 db have been found in automobile radio receivers as a result of antenna mismatching. Additionally, if capacitive tuning is used in conjunction with a capacitive antenna there will exist a sensitivity slope across the band resulting from the variation in the tuned circuit impedance with tuning. This will produce a reduction in sensitivity of about 12 DB at the low frequency end of the broadcast band as compared with an inductively tuned receiver. For this reason, the usual practice has been to utilize slug-tuned coils for tuning automobile radio receivers. Recently, however, interest in electronic tuning has led to the use of varactor diodes for tuning. Varactors constitute capacitive tuning elements which introduce the gain slope problem referred to above into the system. Varactors are nevertheless preferred over saturable core inductors for automatic tuning, because saturable core inductors are physically larger, more expensive, difficult to align for tracking among several stages, and exhibit a hysteresis effect which produces ambiguous readings in a tuning indicator.

Attempts have been made in the art to overcome these disadvantages inherent in the use of capacitive antenna for automobile radio receivers. An example of such attempts is taught in U.S. Pat. application Ser. No. 783,060 now U.S. Pat. No. 3,582,791, filed by Michael Slavin et al. on Dec. 11, 1968 and assigned to the assignee of this application. Slavin et al. teach the isolation of the antenna reactance from the tuned circuit of a radio receiver by means of an untuned field effect transistor amplifier located in the proximity of the antenna. The technique of Slavin et al. effectively isolates the antenna and solves the mismatch and gain slope problems. However, because the amplifier exhibits some degree of nonlinearity, the Slavin et al. technique introduces the problem of the generation of harmonic and intermodulation products across the gate to channel junction of the FET. Therefore, the radio receiver will be particularly sensitive to the second harmonic of an undesired signal whose frequency is half the desired frequency. In the range 540 to 800 KHz, an undesired signal will generate a second harmonic which will be within the broadcast band and will interfere with desired reception in the range 1,080 to 1,600 KHz.

Accordingly, it is an object of this invention to provide an input circuit for a radio receiver which isolates the antenna reactance from the RF tuned circuit.

It is another object of this invention to provide such an input circuit in which the generation of harmonic and intermodulation products is minimized.

These and other objects, features and advantages of the present invention will appear from the following description and appended claims when read in view of the accompanying drawings.

Briefly, the invention is embodied in a circuit for selection of R.F. tuned frequency in an automobile radio receiver in which an untuned amplifier is interposed between the antenna and the tuning elements. The untuned amplifier comprises a dual gate field effect transistor. An FET is an active electrical circuit element comprising a bar of uniformly doped semiconductor material called the "channel" along which is disposed at least one control input area of oppositely doped semiconductor material. The control input areas are known in the art as "gates". At opposite ends of the channel are connected a current input terminal, usually called a "drain", and a current output terminal known in the art as a "source". One gate of said dual gate FET is connected to a d.c. biasing network, the other gate being connected to the antenna. The dual gate FET amplifier is connected as a source follower circuit and tuning is accomplished by the connection of a series tuned circuit between the source terminal of the FET and ground. With reference to the FET amplifier circuitry described herein, the term "source impedance" means the impedance in the circuit of the source electrode of the FET. Source bias is applied to the amplifier by means of a biasing network including an inductive element in addition to the usual resistive element. The inclusion of an inductive reactance element in the biasing network tends to prevent the loading of the tuned circuit by the biasing network and tends to maintain the source impedance of the amplifier circuit at a higher value.

Theoretically, an amplifier with high open loop gain and 100 percent negative feedback can exhibit no internally generated noise or distortion in its output. A source follower having a frequency dependent source impedance departs from this ideal when the input signal frequency is such that the source impedance is substantially reduced. Then harmonic and intermodulation products produced by the gate to channel junction of the FET will appear in significant amount in the amplifier output. At resonance the impedance of the series tuned circuit is approximately 50 ohms, the bias resistor is approximately 300 ohms. This would produce an unacceptable degree of loading of the tuned circuit in the absence of the inductance element which increases the R.F. impedance of the biasing network to several thousand ohms. At all frequencies other than that to which the series tuned circuit is tuned, the series tuned circuit presents an impedance of approximately 3,000 ohms. In the absence of the inductive element in this case the source impedance would be on the order of 300 ohms which would not provide an adequate degree of voltage following in the source follower circuit. Because of the inclusion of the inductive element, the net R.F. impedance in the source circuit exceeds 1,000 ohms which provides for adequate voltage following. This serves to increase the input impedance of the untuned amplifier circuit, the input impedance being equal to the product of the source impedance and the gain of the active device, and to improve the voltage following between the gate and source. The high degree of voltage following provided by the high source impedance serves to minimize the amplitude of any harmonic or intermodulation products generated in the FET. The output of the tuned circuit is fed to an additional tuned circuit in order to increase the selectivity of the receiver. In two of the three embodiments disclosed a second amplifier circuit is interposed between the two tuned circuits to provide additional gain and to permit automatic gain control of the R.F. circuitry of the receiver. In each of the embodiments disclosed the output of the second tuned circuit provides the input signal to the mixer stage of the receiver.

Figure 1:
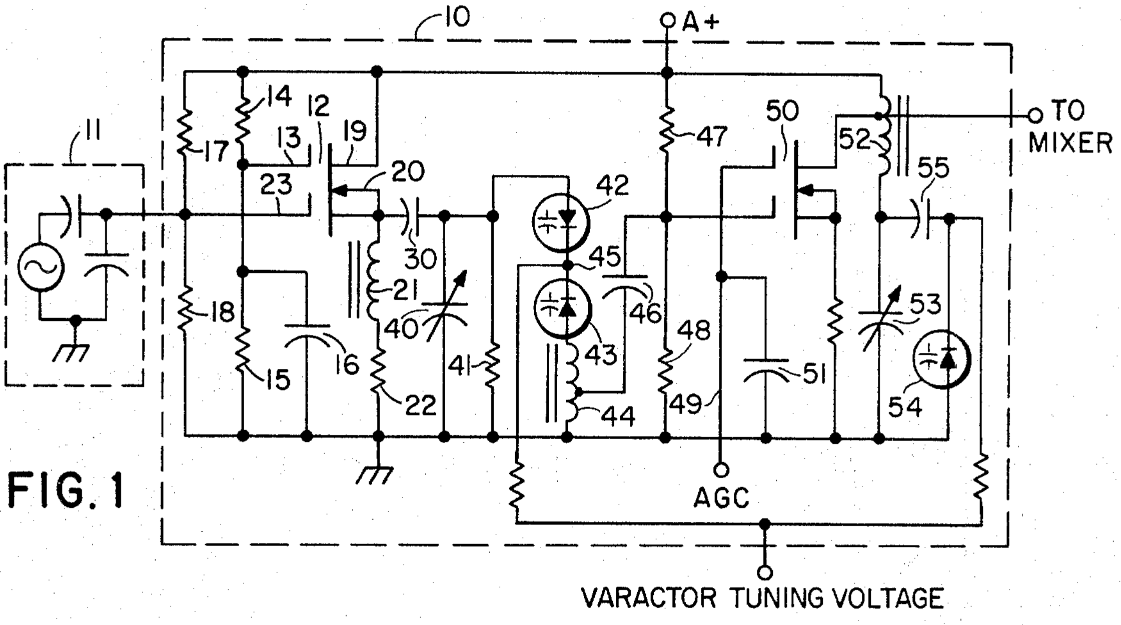
FIG. 1 is an electrical schematic diagram of a preferred embodiment of this invention using varactor diodes for capacitive tuning and two stages of R.F. amplification.

With reference to FIG. 1 an electrical schematic diagram of a preferred embodiment of this invention, indicated generally by reference numeral 10, is shown connected to a capacitive antenna illustrated by its equivalent circuit 11. Circuit 10 comprises a first field effect transistor 12 which is preferably a dual gate metal oxide semiconductor field effect transistor. A dual gate transistor is preferred firstly, so that external neutralization will not be required, and secondly, because dual gate field effect transistors are inherently more linear than single gate FETs. A MOSFET is preferred because it exhibits a lower value of junction capacitance than does a comparable junction FET. A first gate 13 of FET 12 receives a d.c. bias potential from the center tap of a resistive voltage divider network comprising resistors 14 and 15 connected between the source of operating voltage indicated at A+ and ground, and bypassed by capacitor 16. A second gate 23 of FET 12 receives input signals from antenna 11 and a d.c. bias level from the center tap of the network comprising resistors 17 and 18. The drain 19 of FET 12 is connected directly to the source of operating voltage A+. The source 20 of FET 12 is connected to a biasing network comprising inductor 21 and resistor 22 connected electrically in series between source 20 and ground. The inclusion of inductor 21 increases the impedance presented to R.F. energy from source 20 to ground. The R.F. signal output of FET 12 is coupled from source 20 through coupling capacitor 30 to an R.F. tuning circuit comprising elements 40 through 44. Element 40 is a trimmer capacitor for making initial alignment adjustments and is connected in parallel with the remaining tuning elements. Tuning is accomplished by a series tuned resonant circuit comprising back-to-back varactor diodes 42 and 43 in series with inductor 44. Tuning voltage is applied at the junction 45 between varactor diodes 42 and 43. The capacitance of the diodes varies as a function of the voltage at junction 45 with respect to ground. Ground reference is provided for varactor diode 43 by connection through inductor 44, and ground reference is provided for varactor diode 42 by connection through resistor 41. The output of the tuned circuit is taken from inductor 44 and is coupled by means of the self inductance of inductor 44 and coupling capacitor 46 to the input of a second amplifier stage including transistor 50. Capacitor 46 also serves to block d.c. connection between the bias source of transistor 50, consisting of the center tap of a resistive voltage divider network comprising resistors 47 and 48, and inductor 44 of the tuned circuit. Transistor 50 is shown as a dual gate field effect transistor but could be a single gate transistor of metal oxide semiconductor or junction type, or even a bipolar transistor. Embodiments have been constructed using both FET and bipolar type transistors in the second amplifier and each type was found to function satisfactorily. The amplifier per se will be familiar to those skilled in the art. It should be noted that AGC voltage is applied to transistor 50 through conductor 49 bypassed by capacitor 51. The output of the amplifier including transistor 50 is tuned by a second tuned circuit comprising inductor 52 in series with varactor diode 54, varactor 54 being shunted by trimmer capacitor 53. Tuning voltage is applied to varactor 54 to cause the second tuned circuit to tune. D.c. operating voltage A+ is prevented from reaching varactor diode 54 by blocking capacitor 55. The output of the second tuned circuit is coupled by means of the self inductance of inductor 52 to the mixer stage of a broadcast receiver of the type known in the art.

Figure 2:
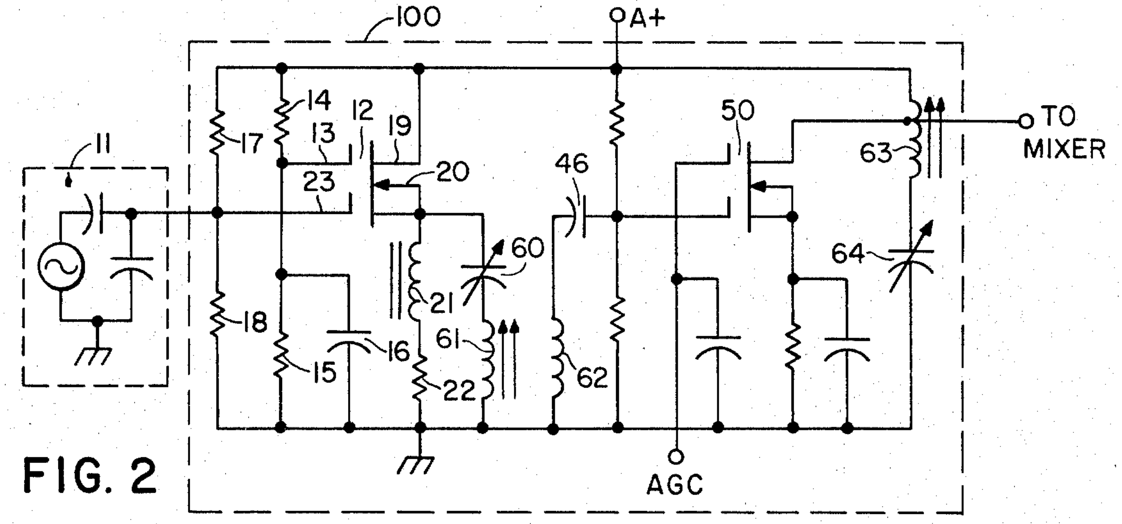
FIG. 2 is an electrical schematic diagram of a preferred embodiment of this invention using slug-tuned coils for inductive tuning and two stages of R.F. amplification.

FIG. 2 is an electrical schematic diagram of a second preferred embodiment of this invention in which antenna 11 provides a signal input to the inventive circuit indicated generally by 100. Circuit 100 is adapted to provide inductive tuning by means of slug tuned coils. Elements 12 through 23 are identical to the corresponding elements of FIG. 1, and perform the same functions as discussed above with reference to FIG. 1. In FIG. 2, the output of the first amplifier is taken from source 20 of FET 12 and is applied across a series tuned circuit comprising trimmer capacitor 60 and slug-tuned coil 61. The output of the tuned circuit is taken by mutual inductive coupling between slug-tuned coil 61 and inductor 62. Inductor 62 is connected to capacitor 46 which functions in the same manner as described in FIG. 1 in supplying input signals to the second amplifier including transistor 50. The output of the second amplifier including transistor 50 is applied to a second tuned circuit comprising slug tuned coil 63 and trimmer capacitor 64 connected electrically in series. In other respects the second amplifier is analogous to that discussed above with reference to FIG. 1. The output of the second tuned circuit in FIG. 2 is also similar to the output of second tuned circuit of FIG. 1 being a self inductive coupling through coil 63 to the mixer of a conventional radio receiver.

Figure 3:
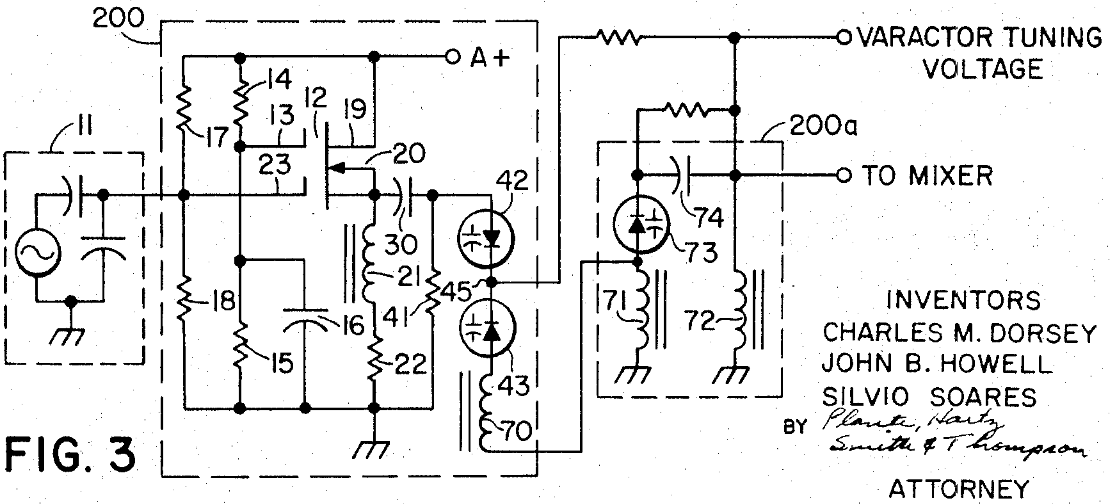
FIG. 3 is an electrical schematic diagram of a preferred embodiment of this invention using varactor diodes for capacitive tuning and a single stage of R.F. amplification.

FIG. 3 is an electrical schematic diagram of a third preferred embodiment of this invention in which antenna 11 provides an input signal to the inventive circuit indicated generally at 200 and 200*a*, and in which only a single stage of amplification is provided. Circuit 200 is identical to the first amplifier and first tuned circuit of FIG. 1 except that inductor 44 of FIG. 1 has been replaced by inductor 70 of FIG. 1. The operation of circuit 200 will therefore not be described in detail. The output of the first tuned circuit is taken by mutual inductive coupling between inductor 70 of circuit 200 and inductor 71 of circuit 200*a*. Inductor 71 is a coupling link which also couples by mutual inductance to inductor 72.

Varactors 42 and 43 and inductor 70 form a first tuned circuit and varactor 73 and inductor 72 form a second tuned circuit. Added selectivity is therefore provided by the use of a double tuned output circuit for the single amplifier stage which is essentially equivalent to the selectivity provided by the circuits of FIGS. 1 and 2.

Inductor 71 is connected in series between each of the tuned circuits and ground. Capacitor 74 is a blocking capacitor for preventing varactor tuning voltage applied to varactor 73 from appearing at the output of the second tuned circuit. The output of the second tuned circuit is connected to the mixer stage of a conventional radio receiver.

The invention claimed is:

1. An input circuit for a radio receiver having an antenna associated therewith and a plurality of signal processing stages, said input circuit comprising:

an active element having a current input terminal, a current output terminal and at least one control terminal, one said control terminal being connected to said antenna to receive a radio signal therefrom;

a series resonant circuit connected to said current output terminal;

a reactive biasing circuit connected in parallel to said series resonant circuit; and means for receiving an output from said series resonant circuit and providing a signal proportional to said output to drive a signal processing stage of said radio receiver, said means for receiving an output including a second active element having at least three terminals, one said terminal of said second active element receiving said output, said proportional signal being taken from a second tuned circuit, said second tuned circuit being connected across two said terminals of said second active element.

2. A circuit as recited in claim 1 wherein said series resonant circuit comprises two varactor diodes and an inductor and said second resonant circuit comprises a varactor diode and an inductor.

3. A circuit as recited in claim 1 wherein said series resonant circuit comprises a capacitor and a slug-tuned inductor and said second resonant circuit comprises a capacitor and a slug-tuned inductor.

4. An input circuit for a radio receiver having an antenna associated therewith and a plurality of signal processing stages, said input circuit comprising:

an active element having a current input terminal, a current output terminal and at least one control terminal, one said control terminal being connected to said antenna to receive a radio signal therefrom;

a series resonant circuit connected to said current output terminal;

a reactive biasing circuit connected in parallel to said series resonant circuit; and means for receiving an output from said series resonant circuit and providing a signal proportional to said output to drive a signal processing stage of said radio receiver, said means for receiving an output including a second tuned circuit and a link coupling inductor for coupling energy from said series tuned circuit to said second tuned circuit, said proportional signal being taken from said second tuned circuit.

5. A circuit as recited in claim 4 wherein said series tuned circuit comprises two varactor diodes and an inductor and said second tuned circuit comprises a varactor diode and an inductor.

* * * * *